United States Patent
Mccoog et al.

(10) Patent No.: US 9,179,016 B2
(45) Date of Patent: Nov. 3, 2015

(54) COMMUNICATION ARCHITECTURES FOR DIRECT PRINTING AND SCANNING

(75) Inventors: Phillip A. Mccoog, Portland, OR (US); Steve Claiborne, Meridian, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 711 days.

(21) Appl. No.: 13/280,878

(22) Filed: Oct. 25, 2011

(65) Prior Publication Data

US 2013/0100486 A1   Apr. 25, 2013

(51) Int. Cl.
G06F 3/12      (2006.01)
H04N 1/00      (2006.01)

(52) U.S. Cl.
CPC .......... *H04N 1/00222* (2013.01); *G06F 3/1204* (2013.01); *G06F 3/1228* (2013.01); *G06F 3/1292* (2013.01); *G06F 3/1296* (2013.01); *G06F 3/122* (2013.01); *G06F 3/1297* (2013.01); *H04N 1/00204* (2013.01); *H04N 1/00278* (2013.01); *H04N 2201/0068* (2013.01); *H04N 2201/0081* (2013.01); *H04N 2201/0094* (2013.01); *Y02B 60/1271* (2013.01)

(58) Field of Classification Search
USPC .......................... 358/1.6, 1.9, 1.13, 1.15, 1.18
See application file for complete search history.

(56) References Cited

U.S. PATENT DOCUMENTS

| | | | |
|---|---|---|---|
| 7,064,856 B2 | 6/2006 | Fu et al. | |
| 7,324,228 B2* | 1/2008 | Chiarabini et al. | 358/1.15 |
| 7,420,699 B2* | 9/2008 | Farrell et al. | 358/1.15 |
| 7,447,992 B2* | 11/2008 | Kawabata | 715/243 |
| 7,948,651 B2* | 5/2011 | Truong et al. | 358/1.6 |
| 8,085,414 B2* | 12/2011 | Ishikawa | 358/1.13 |
| 2004/0083430 A1* | 4/2004 | Boonen | 715/523 |
| 2005/0225795 A1 | 10/2005 | Nuggehalli et al. | |
| 2006/0087678 A1* | 4/2006 | Simpson | 358/1.15 |
| 2008/0180726 A1 | 7/2008 | Selvaraj | |
| 2008/0231886 A1* | 9/2008 | Wehner et al. | 358/1.15 |
| 2011/0194123 A1 | 8/2011 | Sweet et al. | |

OTHER PUBLICATIONS

"Xerox Print Driver Platform"; Sep. 10, 2010; http://ebookpedia.net/Xerox-Print-Driver-Platform-Xerox-Global-Print-Driver-Xerox-Mobile----.html.
Michelon, Richie; "How to Choose the Best Universal Print Driver for Your Mobile Work Force"; Aug. 25, 2009; http://www.eweek.com/c/a/Printers/How-to-Choose-the-Best-Universal-Print-Driver-for-Your-Mobile-Work-Force/.
"UniPrint Products & Services"; http://www.uniprint.net/ProductUniPrintSuite.aspx?TypeID=TSE#TSE.

(Continued)

*Primary Examiner* — Vu B Hang
(74) *Attorney, Agent, or Firm* — Van Cott, Bagley, Cornwall & McCarthy (57) ABSTRACT

One example of a communication architecture for direct printing and scanning includes a computing device for generating an electronic image and a page description language for producing a deterministic print file of the electronic image, the deterministic print file being natively viewable in a Portable Document File (PDF) viewer. The architecture also includes a printer for receiving the deterministic print file and for beginning printing the electronic image before the complete deterministic print file is received by the printer. A method for printing a document is also provided.

20 Claims, 7 Drawing Sheets

(56) References Cited

OTHER PUBLICATIONS

Hewlett-Packard Development Company, L.P.; "HP ePrint & Share: User's Guide," Jun. 1, 2011; <http://h20628.www2.hp.com/km-ext/kmcsdirect/emr_na-c02842704-2.pdf>.

Adam Haigh; "An Interview with HP;" Jul. 2, 2010; <http://www.castleink.com/category/342/An-Interview-with-Tuan-Tran-of-Hewlett-Packard.html?language=en>.

Apple Support Communities, "AirPrint Information and FAQ," web p. 1, Nov. 2010, <https://discussions.apple.com/thread/2658560?tstart=0>.

Copyright Hewlett-Packard Development Company, L.P., "ePrint Mobile Driver: User Guide," Aug. 2011, <http://h10032.www1.hp.com/ctg/Manual/c02961946.pdf>.

HP Enterprise; "ePrint—Pages From Clouds;" May 18, 2011; <http://www.slideshare.net/HPenterprise/cd-41hp-managed-pring-services-and-solutionsfinal?from_action=save>.

Jennifer Matt, "Google, HP, & FedEx Office—Cloud Printing Pioneers," Sep. 7, 2010, <http://whattheythink.com/articles/46240-google-hp-fedex-office-cloud-printing-pioneers/>.

Wikipedia; "HP ePrint;" Aug. 10, 2011; <http://en.wikipedia.org/w/index.php?title=HP_ePrint&oldid=444076396>.

Wikipedia; "Printer Command Language," Sep. 13, 2011; <http://en.wikipedia.org/w/index.php?title=Printer_Command_Language&oldid=450293754>.

Hewlett-Packard Development Company, L.P.; "HP Introduces the Future of Printing: Web Connected and Cloud Aware;" Jun. 7, 2010; <http://www8.hp.com/us/en/hp-news/press-release.html?id=472358#.VUyxivlVitN>.

Hewlett-Packard Development Company, L.P., "HP ePrint," 2010, <http://www.hp.com/hpinfo/newsroom/press_kits/2010/JustRightITopk/ePrint_Backgrounder.pdf>.

Appleinsider; "Inside AirPrint: Apple's printing system for iOS—p. 2;" web p. 2; Nov.-Dec. 2010; <http://forums.appleinside.com/t/114652/inside-airprint-apples-printing-system-for-ios/40>.

Hewlett-Packard Development Company, L.P., "HP ePrint Enterprise mobile printing solution," Sep. 2010, <http://www.hp.com/hpinfo/newsroom/press_kits/2010/InnovationSummit/HP_ePrint_Enterprise_Solution.pdf>.

* cited by examiner

COMMUNICATION ARCHITECTURES FOR DIRECT PRINTING AND SCANNING

BACKGROUND

Computing devices can send data such as pictures and text to a printer for printing. However, printer drivers are installed on the computing devices before they can utilize printers and printer services. The printer drivers are specific to both the operating system and a given printer and act as a software interface between the computing device and the printer. The use of operating system/printer specific print drivers has a number of disadvantages. Separate print drivers are installed on the computing device for each printer the device will interface with. For portable and handheld computing devices, the complexity and size of the print drivers may exceed the capacity of the devices and consequently may prevent efficient printing from these devices. In addition, can be difficult and costly for printer vendors to supply drivers for all the current computing devices, operating systems and printers.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Computing devices generate and store a wide range of data that can be printed. The computing devices may generate documents, pictures, models, files, presentations, scanned images, forms, web pages and other data. For a variety of reasons, a user may wish to print a hard copy of this data using a printer. The user may have access to a number of computing devices and printers. However, to access the printing devices, drivers need to be installed on the computing devices before they can utilize printers and printer services. The printer drivers are specific to both the operating system and a given printer and act as a software interface between the computing device and the printer. The use of operating system and printer specific print drivers has a number of disadvantages. Separate print drivers are installed on each device for each printer the device will interface with. The installation of the printer driver can be a time consuming and complex process. Installation of a print driver includes ascertaining which printer is available and then determining which printer driver is compatible with their computing device, operating system and printer. The user then downloads this driver from the printer vendor's web site and then proceeds through the installation and setup. If the download, installation, and setup are successfully concluded, the user can then print the desired document. This process is repeated by the user for each of their computing devices and for each new printer encountered. For portable and handheld compute devices, the complexity and size of the print drivers may be too great and consequently may prevent efficient printing with these devices. In addition, it is difficult and costly for printer vendors to supply drivers for all the current computing devices, operating systems and printer architectures.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
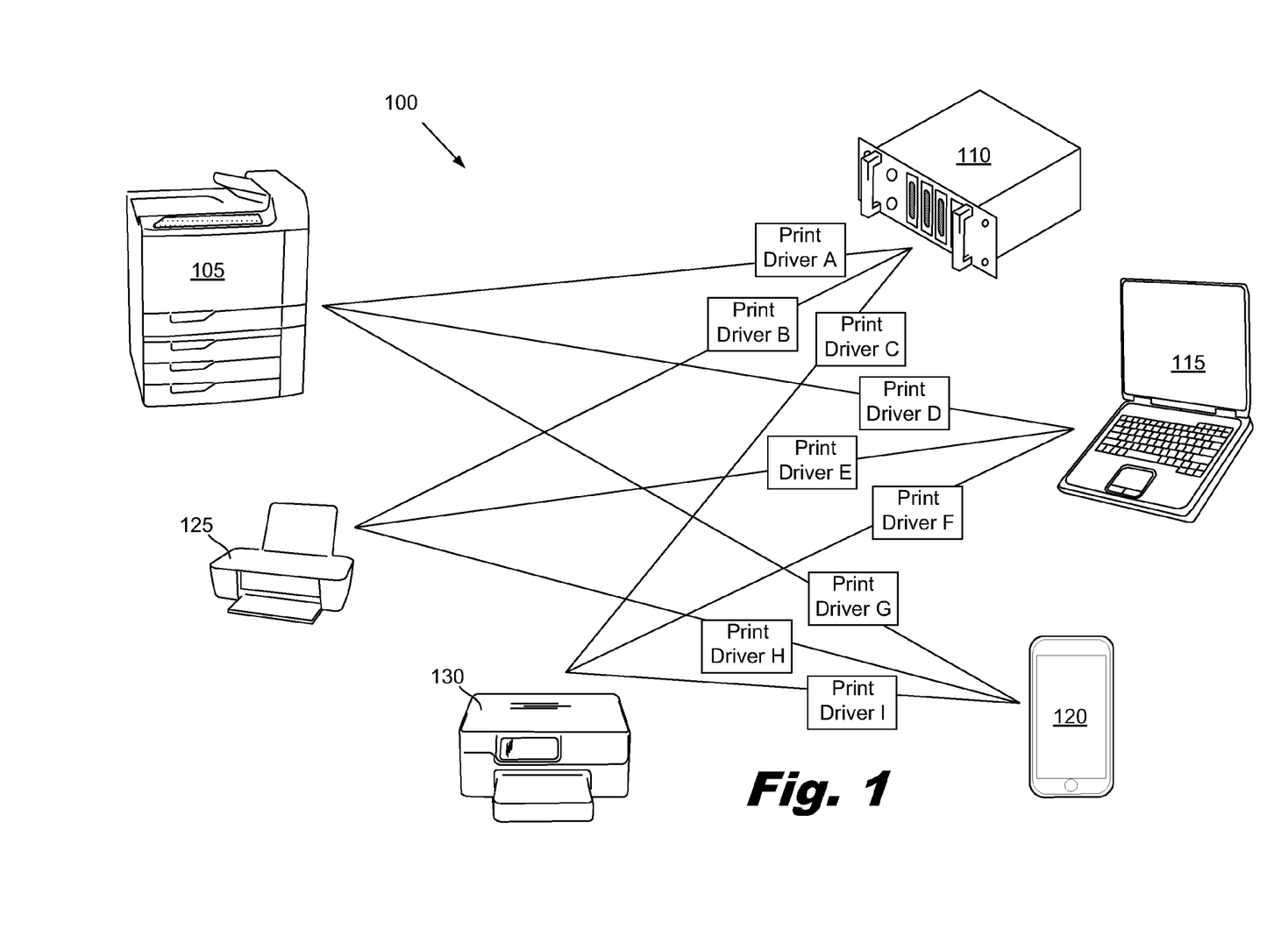
FIG. 1 is a diagram of an illustrative computer system than uses operating system and printer specific print drivers, according to one example of principles described herein.

As discussed above, individual print drivers have to be installed on each computing device for each printer. FIG. 1 is a diagram of an illustrative computing system that includes a number of computing devices and printers that are connected using various networks and protocols. The printers include an enterprise printer (105), a multifunction desktop printer (130) and a basic printer (125). The enterprise printer (105) may include a wide range of capabilities including duplexing, selection of different paper sizes, color printing and other options. The multifunction desktop printer (130) may include features such as scanning, copying, faxing, and printing. The basic printer (125) has minimal computing and memory capabilities and produces basic prints in a straightforward manner.

Computing devices in the system (100) include a rack mounted server (110), a laptop (115) and a mobile device (120). Each of these devices may have different capabilities and use a different operating system. For example, the rack mounted server (110) may have large amounts of memory and multiple processors running Linux based operating systems. The laptop (115) may have more limited capabilities and run a Windows based operating system. The mobile device (120) may have a low power processor and limited memory and use an Android or iOS operating system. The computing devices many be communicatively connected in a variety of ways including hardwired connections, such as Universal Serial Bus (USB) and Ethernet protocols, and wireless connections, such as cellular, WiFi, and WiFi Direct.

To communicate with the printers (105, 125, 130) the computing devices need a print driver that is specific to both the operating system and the printer. Each print driver is specifically designed to interface with a particular operating system and correctly represent the capabilities of the printer. When correctly installed, the print driver acts as a translator between the software operating within the operating system and the printer. In this example, nine different printer drivers are needed. Printer drivers A, B, and C are specific to the Linux operating system. Printer driver A interfaces between the Linux operating system and the enterprise printer (105). Printer driver B interfaces between the Linux operating system and the basic printer (125). Printer driver C interfaces between the Linux operating system and the multifunction desktop printer (130). Similarly, printer drivers D, E and F are specific to the Windows operating system on the laptop and connect it to the printers (105, 125, 130). Printer drivers G, H, I are specific to the iOS operating system of the mobile device (120).

As discussed above, to print data from a computing device to a printer, the printer must first be identified and the correct print driver obtained. The driver is then installed on the computing device and a connection made with the printer. Only after installing the correct print driver can printing proceed.

In some cases, the printer drivers may exceed the computational and memory capacity of the computing device. The overall trend in computing devices is moving toward physically smaller and more portable devices. This trend often reduces the computing device's rendering capabilities and available RAM and permanent storage. For these portable and handheld computing devices, the complexity and size of the print drivers may be too large or complex for the devices and consequently may prevent efficient printing from these devices. Additionally, the challenge of identifying, obtaining, and installing the correct printer driver can be particularly frustrating when using a computing device in new locations with new printers. Further, creating and maintaining printer drivers for all operating systems and printers can be a significant burden on the printer manufacturer.

To address these and other issues, the inventors have developed a unique Printer Control Language (ePCL) to allow computing devices to quickly identify available printers (both local and remote), discover the printers' capabilities and preferences, configure the printers for job preferences, and deliver print payloads, all without the need for installation of print drivers. This simplifies the process of connecting computing devices to printers as well as reducing the time involved in setting up the printer connection. A user simply identifies the printer that they would like to print to, selects the job specific settings (such as media and duplex settings), and initiates the print job.

ePCL is both operating system agnostic and compatible with a wide range of printers having a varying range of capabilities. Consequently, there is no need for individual printer drivers. ePCL produces deterministic streaming print files that can be accepted by a wide range of printers, including printers that have very limited computational and memory capabilities. Further, the print files can be viewed, edited, and archived in their native format. This allows for a wide range of operations without conversion of the print file into a different file format.

Figure 2:
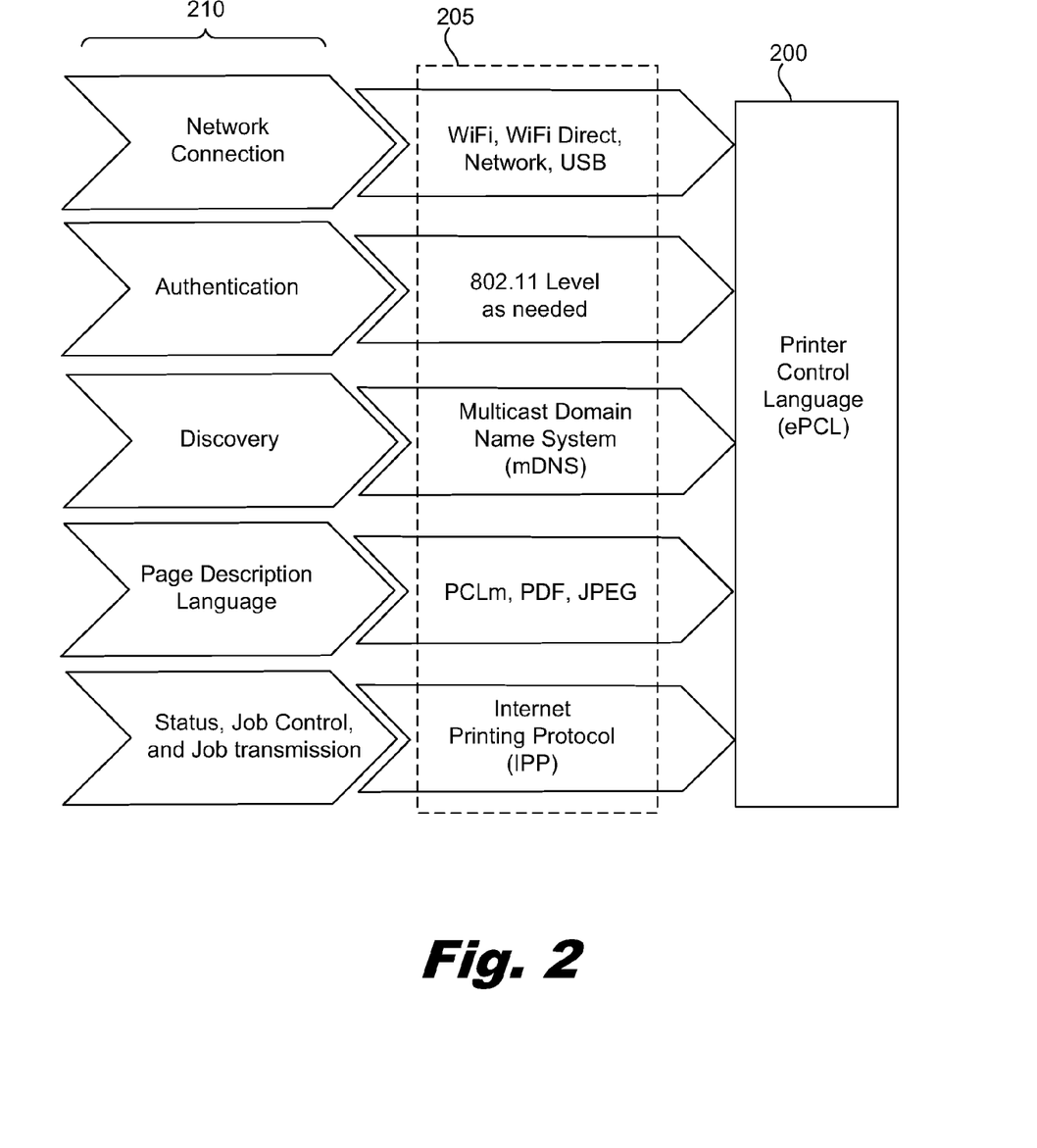
FIG. 2 is a diagram showing components of an illustrative communication architecture for direct printing and scanning, according to one example of principles described herein.

FIG. 2 is a diagram showing components of an illustrative ePCL stack for a communication architecture for direct printing and scanning. To effectively interface between a wide range of operating systems and printers the ePCL stack provides a number of functions (210) including: establishing networking connections, authentication, device discovery, a page description language, and print job transmission/monitoring. To implement these functions, ePCL includes a number of protocols (the "stack") that provide the desired capabilities and universal printing ability. The stack (205) includes connection, authentication, and discovery protocols. In this example, the supported network connection protocols include WiFi, WiFi Direct, Network, and Universal Serial Bus (USB) protocols. WiFi is a wireless connection that allows communication between enabled devices and networks using wireless access points. WiFi Direct is a standard that allows WiFi devices to communicate directly with each other without the need for wireless access points. Network protocols include Ethernet and LAN protocols. USB is a widely accepted industry standard for wired connections between computer devices and peripherals.

Authentication functions in the ePCL stack are provided by the 802.11 set of standards. 802.11 standards describe implementation of wireless local area networks and provide the basis for wireless networks produced using WiFi and WiFi direct. In general the 802.11 standards provide for initiation, negotiation, and authentication of connections between computing devices.

Discovery in the ePCL stack (205) utilizes the Multicast Domain Name System (mDNS). mDNS is a set of techniques that automatically creates usable Internet Protocol network without user intervention. mDNS uses application programming interfaces to communicate between computers, devices, and services assigned domain names. Each computing device in the network, including printers, stores a list of DNS resource records and joins the mDNS multicast group. When an mDNS client wants to know an IP address of another participating device, the mDNS client sends the request to a well-known multicast address. The request is then broadcast over the network. The participating device then responds with its IP address. mDNS also includes Service Discovery (SD) that uses DNS messages, such as SRV, TXT, and PTR records, to advertise service instance names. The hosts, such as printers, then publish details of the available services: instance, service type, domain name, and optional configuration parameters. The use of mDNS allows for automatic discovery of printers and their capabilities by connected computing devices.

The Page Description Language (PDL) is a language that describes the appearance of a printed page at a higher level than an actual output bit map. The ePCL stack supports a number of page description languages for flexibility to adapt to various printer capabilities. For example, the ePCL uses Portable Document Format (PDF) to represent documents in a manner that is independent of application software, hardware and operating systems. In some situations, it may be desirable to use a PDF version with a full complement of commands, such as PDF 1.4, PDF 1.7 or PDF 2.0.

However, for devices with low computational ability and/or low memory capacity or networks with lower data transmission rates, documents rendered using full function PDF can be undesirable. Documents rendered in PDF are typically not streamable because the entire document must be sent to the computing device or printer before the document can be entirely understood. For example, the first bit of a PDF file can be, in theory, altered by the last bit of the PDF file. For example, the last segment of the PDF file could change the font table for the whole file. Thus, the whole PDF file must be received by the printer prior to printing. For large PDF files, there can be an unacceptable delay while the complete PDF file is downloaded to the printer. Further, printers with low computational ability and/or low memory capacity may be unable to store and render large PDF files. Even so called "streamable" or "linear" PDF files are not actually streamable. Linear PDF files use commands that can radically alter the printing of preceding portions of the data file. A specific example is a linear PDF file that is transmitted to a printer where, near the end of the PDF file, the orientation of the page is designated as being in landscape orientation rather than portrait orientation. This changes the printing of the entire document.

Consequently, the printing of a full function PDF document cannot be started until the complete PDF file is available to the printer. As discussed above, some printers may lack the memory and/or computing power to store and process large PDF files. Further, waiting for the complete PDF file to be transferred to the printer can result in an unacceptably long delay before printing begins. Thus, using the PDF format with its complete command set is not tenable for some printing situations.

To create a streamable PDF document, a new protocol called Printer Control Language—Mobile (PCLm) has been created. PCLm has been developed using a subset of the PDF grammar. PCLm allows for consumption of the print files by all PDF 1.4 or later compliant devices and allows for both printing and viewing of the rasterized pages. PCLm may exclude a number of PDF grammar constructs including text, vector, images, patterns, transparency and blending instructions. The exclusion of these commands makes PCLm deterministic because commands that could be retroactively applied to data which has already been streamed have been eliminated. This allows printers to begin printing as soon as the PCLm data stream begins to be received. This minimizes the amount of memory and computation required by the printer and allows low end printers to effectively print large documents.

PCLm is device independent because PCLm supports standard and device independent imaging constructs. Image data is in contone space (8 bit gray and 24 bit RGB) and has not been altered in any device dependent way. PCLm is also minimalistic because it is designed to be lightweight and efficient. This allows low-end consuming devices with limited processing power and memory to consume PCLm files. However, the configurability of the language also enables high-end devices to improve throughput and performance.

As used in the specification and appended claims, the term "streamable" refers to print files whose data is not retroactively altered by subsequent data in the file. This allows the print files to be streamed to the printer and printing to begin prior to receiving the entire print file because portions of the print file that are received by the printer are not modified by subsequent data. Consequently, the printer can begin printing once a predetermined amount of data has been received. For example, after receiving a swath or page, the printing can commence because subsequent data will not retroactively alter the data already received. In some embodiments, the print files may be streamable in that each bit of data representing a portion of an image to be printed is not altered once it is received by the printer.

As used in the specification and appended claims, the term "deterministic" refers to files, protocols and techniques that produce print jobs (payload) of known size and complexity. This guarantees that the printer will always be able to print the job without causing a memory out or a performance issue. For example, a print file that uses retroactive commands is not deterministic because the complete print file must be received, stored and manipulated by the printer. Because print files have varying sizes (sometimes as large as hundreds of megabytes), there is no guarantee that the printer will have enough memory or processing power to print the job.

PCLm is viewable by all standard PDF viewers because it is constructed with a proper subset of PDF. Some PCLm language constructs are added to the grammar to facilitate viewing. These additional constructs can be ignored by consuming devices. PCLm documents are also archivable because they are constructed so that they can be stored and re-printed at later times. Additionally, PCLm is predictable and deterministic in its rate of document consumption and page production. Some performance variability can be incurred by the size and complexity of the input page image, but this will not cause significant throughput degradation. PCLm formatted documents are streamable because all the content for imaging a page is delivered by the end of that page's description within the PCLm stream. Raster data contained within the page is delivered in a page-logical-top to page-logical-bottom, thus allowing trivial consumption by the consumable device. To enhance page streamability in low memory devices, PCLm can support segmentation of individual pages into strips or swaths. The height of the strips will be device dependent and discovered during the IPP device capabilities query. This process may reduce the amount of memory required to buffer the raster page.

The printer status, job control, and job transmission are performed using Internet Printing Protocol (IPP). IPP provides a standard network protocol for remote printing and managing print jobs, media size, resolution, etc. IPP is implemented using Hypertext Transfer Protocol (HTTP) and inherits all of the HTTP streaming and security features, including encryption protocols such as Transport Layer Security (TLS) and HTTPS. IPP allows clients to query a printer's capabilities, submit print jobs, query the status of a printer, query the status of print jobs, cancel previously submitted jobs, and other actions.

Some PCLm devices have limited resources and thus cannot perform all necessary raster and page-order transformations to support duplex printing. Therefore, PCLm devices may require that the client develop the raster for the backside of duplex jobs so that it is oriented (flipped and or mirrored) correctly for the consuming device and possibly reorder the pages. The client computing device can discover the requirements of the consuming device by the IPP attribute backside-orientation and backside-scan-direction. PCLm can support a number of scanline orientations for backside duplex pages including: bottom-to-top or top-to-bottom, right-to-left or left-to-right, and frontside-first or backside-first. These scan line orientations are noted in the file and may not adversely affect the viewing of the file.

Print files are immediately viewable by any PDF enabled device without conversion. As discussed above, the display file and the print file are the same.

Figure 3:
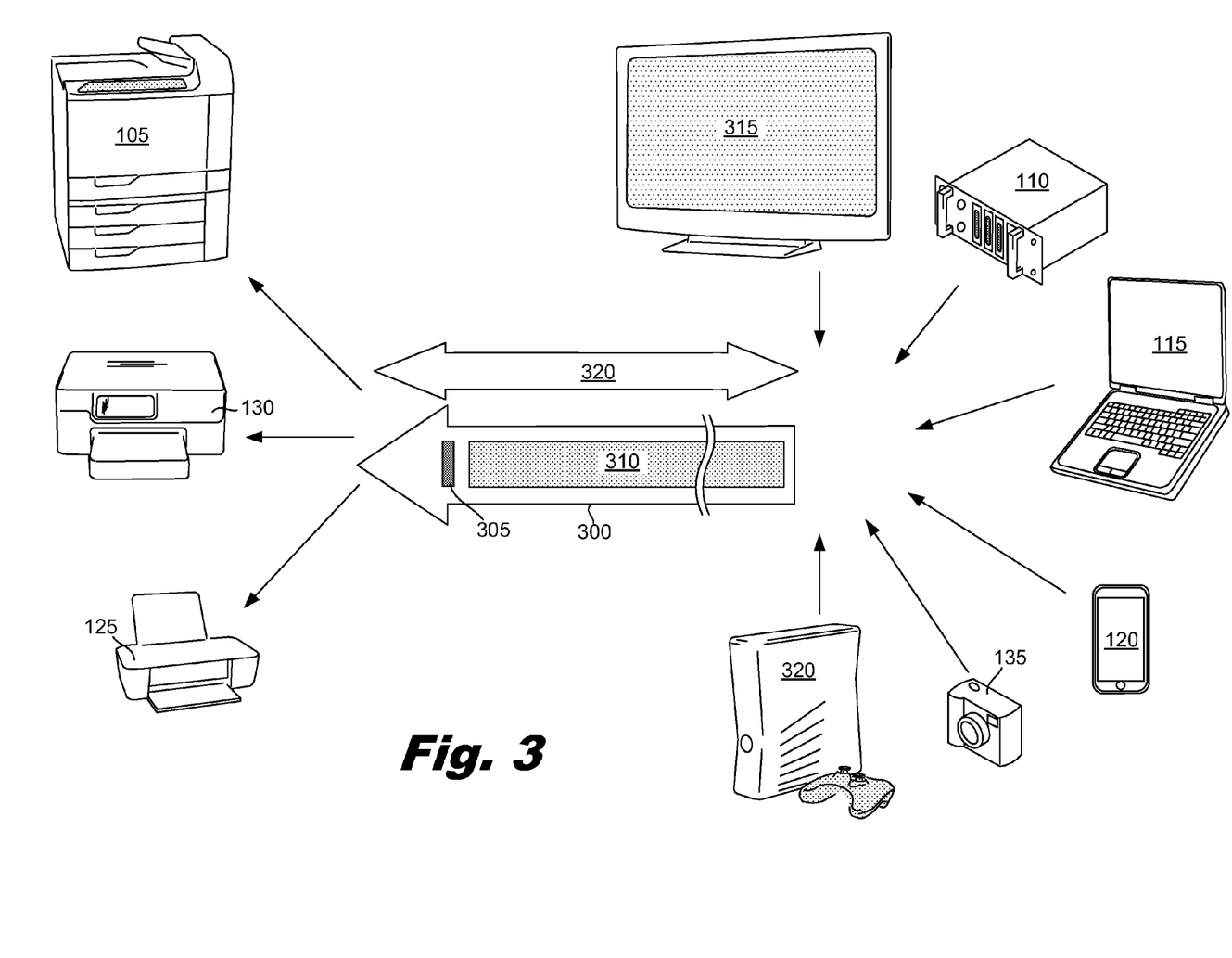
FIG. 3 is a diagram of a computer system using an illustrative communication architecture for direct printing, according to one example of principles described herein.

FIG. 3 is a diagram of a flowchart that describes one illustrative method for using ePCL printing architecture. In FIG. 3 a number of computing devices are shown on the right that have the capability to generate print files. These devices include a laptop computer (115), a rack server (110), a mobile device (120), a camera (135), a gaming station (320) and an internet enabled television (315). This list of devices is not intended to be exhaustive. A variety of other devices, such as scanners and printers, could also be included as computing device that are capable of producing print files. These devices are each able to generate a PCLm file (300) that is streamed to the printing devices (105, 125, 130) on the left. The printing devices are ePCL compliant and include an enterprise printer (105), a multifunction desktop printer (130) and a basic printer (125).

As discussed above, the ePCL architecture initiates communication between the various devices using mDNS protocols. As discussed above, the mDNS client sends the request to a well-known multicast address. This request is then broadcast to over the network. The participating printers then respond with their IP addresses and publish details of the available services. This two way mDNS interchange is shown by the double headed arrow (320). During this two way communication, the printer may communicate with the computing device using internet printing protocol (IPP). For example, the computing device may query the printer to determine the capabilities of the printer. The computing device may query the printer regarding PCLm raster orientations, chromatic mode, backside duplex orientation, compression information, ePCL version information, and other ePCL specific information.

After a connection is made to the desired printer, the computing device generates a PCLm print file (300) that is compatible with the printer. The PCLm print file (300) includes a header (305) that identifies the file as a PCLm print file and a body (310) of raster data that describes the page content. Because generation of a PCLm print file has low computational requirements even rudimentary computing devices, such as a camera (135), are capable of formatting its image data into the file format. The PCLm print file can be accepted by any of the printing devices. Because the print file is streamable and deterministic, the printers can immediately begin printing when they receive the file. Further, printing the PCLm file does not consume large amounts of memory. Consequently, even the basic printer (125) is capable of printing large PCLm files in an efficient manner. Alternatively, the computing device could generate a PCLm file that is specifically tailored to capabilities of the printer, such as generating scanline orientations for backside duplex pages on the enterprise printer (105).

The system shown in FIG. 3 is only one example. A variety of other configurations and devices could be used. For example, the multifunction desktop printer (130) and the enterprise printer (105) may both be capable of producing PCLm files when scanning documents and may communicate these PCLm files to computing devices for storage, viewing or manipulation or may communicate the PCLm files directly to other computing devices.

Figure 4:
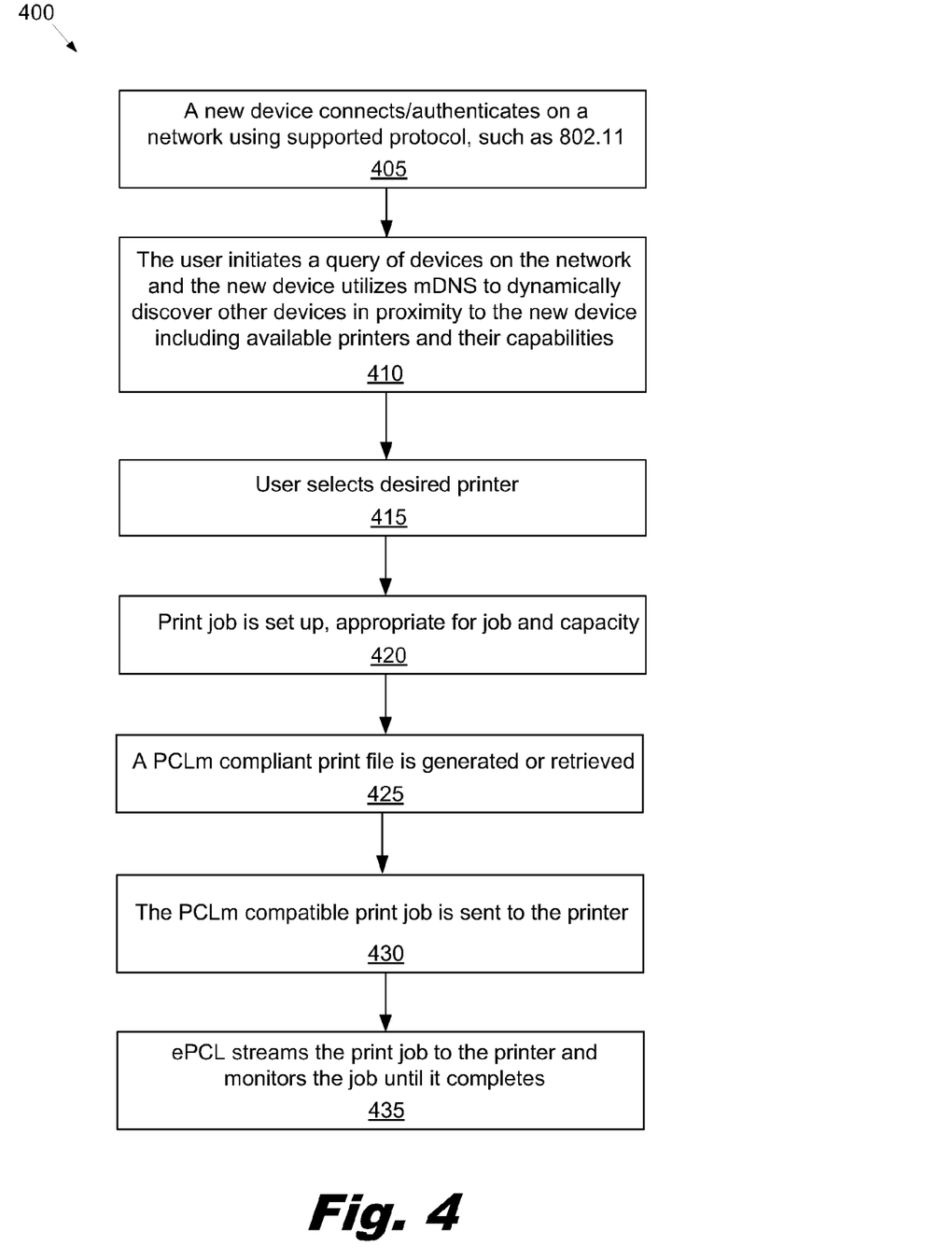
FIG. 4 is a flowchart of system for utilizing an illustrative communication architecture for direct printing to discover printers and stream print jobs to selected printers, according to one example of principles described herein.

FIG. 4 is a flowchart (400) of an illustrative method for using ePCL for printing using a device that is not initially aware of available printers ("a new device"). The new device connects to the network using a supported protocol, such as 802.11 (block 405). The user initiates a query of devices on the network and the new devices utilize mDNS to dynamically discover other devices in proximity to the new device, including available printers and their capabilities (block 410). Dynamic discovery allows users to identify printers with the appropriate capabilities that are in their vicinity without physically wandering around to find a printing device that is online, capable of producing the output that they desire, manually determining how to talk to that device and then installing a driver to be able to print to it. ePCL eliminates all these user concerns. ePCL dynamic discovery utilizes mDNS for discovery of printer qualities and capabilities, such as color or monochrome, high through-put devices, printers with document finishers (staplers, stackers, etc.), duplex capabilities, etc. This discovery will allow the user to choose a device that meets their imaging needs, performance, print quality, and that is in the vicinity of the user's present location.

After the proximal printers and their capabilities have been discovered, the user simply selects the desired printer (block 415). The print job is then set up for the printer (block 420). In the past, the job setup capabilities were static in nature, derived from the specific driver that was installed. So, if the user wanted to print to a duplexing printer, they would have to inform the driver that the duplex option was installed, and then select the duplex option in the driver menu. ePCL provides dynamic discovery of the device capabilities and will present the relevant options to the user. Because ePCL is generic and dynamic, no print-driver setup is necessary to recognize or utilize the printer options.

A PCLm compliant print file is generated or retrieved (block 425). Job formatting is based upon the printer's capabilities and its preferences. Some printers may have the ability to print both raster and PDL and will issue a preference for one or the other format, based upon printer capabilities and job information.

Once the device is discovered, its capabilities identified, and the user selections made, and the PCLm compliant print file generated, ePCL streams the print job to the printer and monitors the job until it completes (block 435). The device will then notify the user that the job is completed and ready for pickup.

Figure 5:
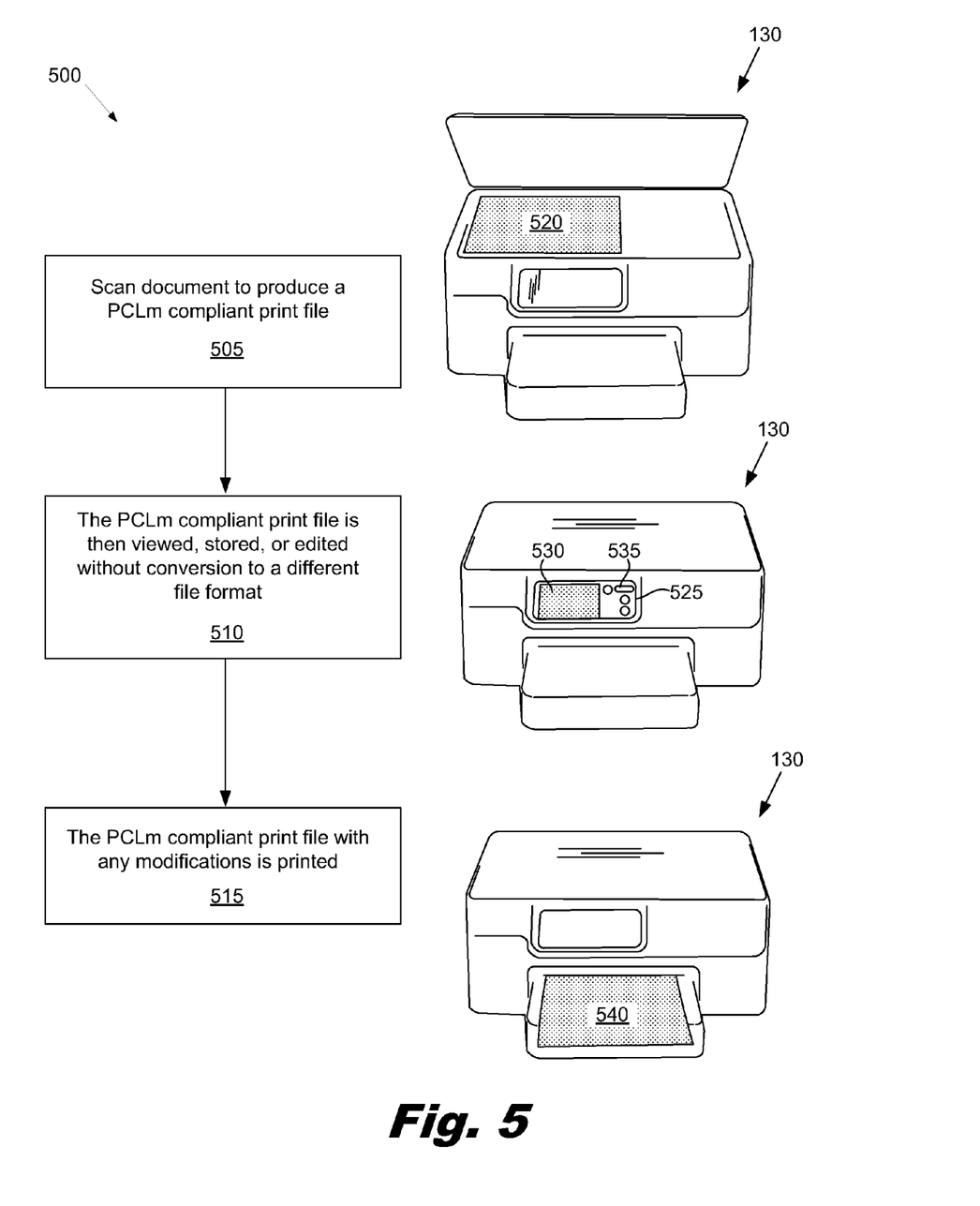
FIG. 5 is a flowchart and associated diagrams of a method for using the communication architecture to create, edit, and print a PCLm compliant print file, according to one example of principles described herein.

FIG. 5 is a flowchart (500) and associated diagrams of a method for using ePCL techniques to create, edit, and print a PCLm compliant print file. In this example, a multifunction printer (130) creates a PCLm compliant print file by scanning a document (520) (step 505). There are a number of additional ways that a PCLm compliant print file could be made. For example, a PCLm compliant print file could be generated using various software programs resident on a computing device. For example, a word processing or drawing application could include a print option that prints the document to a PCLm compliant print file. The PCLm compliant print file can then be viewed, stored, or edited without conversion to a different file format (step 510). In this example, an image of the document (530) is displayed on a touch screen (525) on the multifunction printer (130). Various controls (535) on the touch screen (525) allow the document to be viewed and edited. For example, if the document includes multiple pages, one or more pages could be deleted from the file. The PCLm compliant print file with any modifications is printed on the multifunction printer (130) to produce a new printed document (540). In some implementations, the printer driver stack can be implemented on a general purpose processor, an Application Specific Integrated Circuit (ASIC) or Field Programmable Gate Array (FPGA). ASICs are customized for a particular use rather than for general purpose use. Because the ASICs are customized for a task or set of tasks, they can be much faster and power efficient in performing that task than a general purpose processor. The FPGAs are an integrated circuit that is designed to be configured by the customer or designer after manufacturing.

Figure 6A:
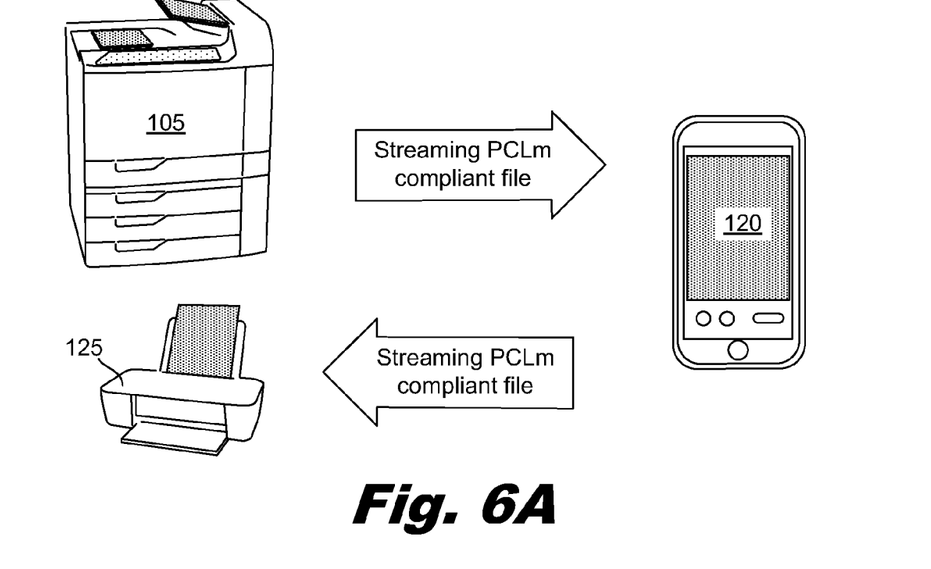
FIG. 6A is a diagram of a system using the communication architecture to create, edit and print a PCLm compliant print file, according to one example of principles described herein.

FIG. 6A is a diagram of a system for using ePCL techniques to create, edit and print a PCLm compliant print file. In this example, a business person is away from their office and needs to edit and print a portion of a large contract located at a client's place of business. The business person has previously instructed their mobile device to find nearby printers and connect with them. In this instance, the business person does not have credentials to access the local area network of the client. The mobile device, after attempting unsuccessfully to log onto the local area network, connects to one or more nearby printers using the WiFi Direct standard. As discussed above, the WiFi Direct standard allows WiFi enabled devices to communicate directly without the need for wireless access points or wired connections.

The business person then instructs an assistant to scan the document using an enterprise printer (105) to create a PCLm compliant print file. This PCLm compliant print file is then streamed across a cellular network as it is scanned. The business person receives the streamed PCLm compliant print file on their mobile computing device (120) and reviews and edits the file. Even though the stream rate across the cellular network was not particularly fast, the review and editing of the file on the computing device (120) can begin as soon as the streaming data begins to arrive. There is no need for the complete file to arrive prior to viewing or editing. After making any desired modification, the business person instructs the document to begin printing on a nearby basic printer (125) that is ePCL enabled. The basic printer (125) does not need to receive the entire PCLm compliant print file prior to beginning to print. Instead, the basic printer (125) begins printing the pages as it receives them. In some circumstances, the basic printer (125) may begin printing prior to the completion of the scanning of the original document.

Figure 6B:
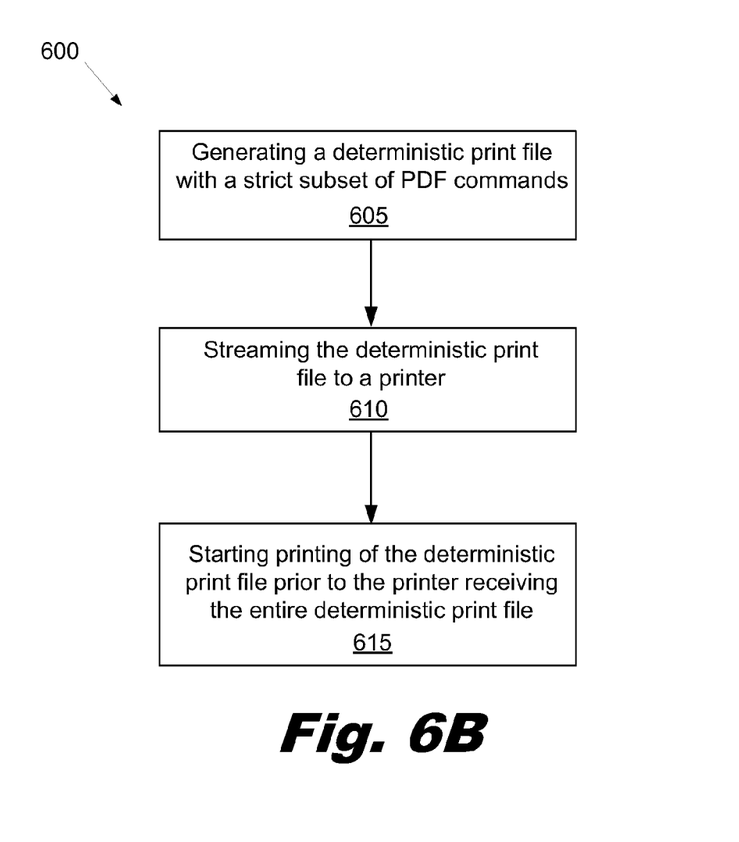
FIG. 6B is a flowchart of a method for printing a document using the communication architecture, according to one example of principles described herein.

FIG. 6B is a flowchart (600) of an illustrative method for using ePCL techniques to print deterministic print files. As described above with respect to FIG. 6A, a deterministic print file is generated using a strict subset of PDF commands (block 605). The phrase "strict subset" refers to the elimination of non-deterministic PDF commands from the PCLm vocabulary. This ensures that the resulting print file is deterministic and streamable. These deterministic print files can be natively viewable using common file viewing applications such a PDF viewers. As used in the specification and appended claims, the term "native" or "natively" as applied to print files refers to print files that are in the original file format that they were created in. For example, a print file's native format may be PCLm. Because PCLm uses a strict subset of the PDF protocol to describe the raster image, the print file may be viewed and manipulated in any PDF application in its native format. This provides a number of advantages. For example, the PDF infrastructure and viewers are already in place on computing devices. There is no need to develop new viewing software or guide users through installation of a new program. Consequently, files generated in PCLm format are natively compatible with the entire PDF ecosystem including optical character recognition, encryption algorithms, archivers, etc.

To generate a print file compatible with the printer, the computing device can generate a streamable raster file that incorporates only basic commands and formats used by all ePCL compliant devices. Alternatively, the computing device can obtain specific information about the printer capabilities by sending a query of to the printer using internet printing protocol. The query and the printer's response may include a variety of information, including PCLm raster orientations, chromatic mode, backside duplex orientation, compression information, ePCL version information and other information.

The deterministic print file begins to be streamed to a printer from the computing device (block 610). In the example above, the PCLm compliant print file is streamed from the computing device (120) to the basic printer (125). Before the basic printer (125) receives the entire deterministic print file, the printer starts printing (block 615). In some embodiments, the computing device (120) may receive an indication that printing has begun prior to streaming the complete deterministic print file to the printer.

Figure 7A:
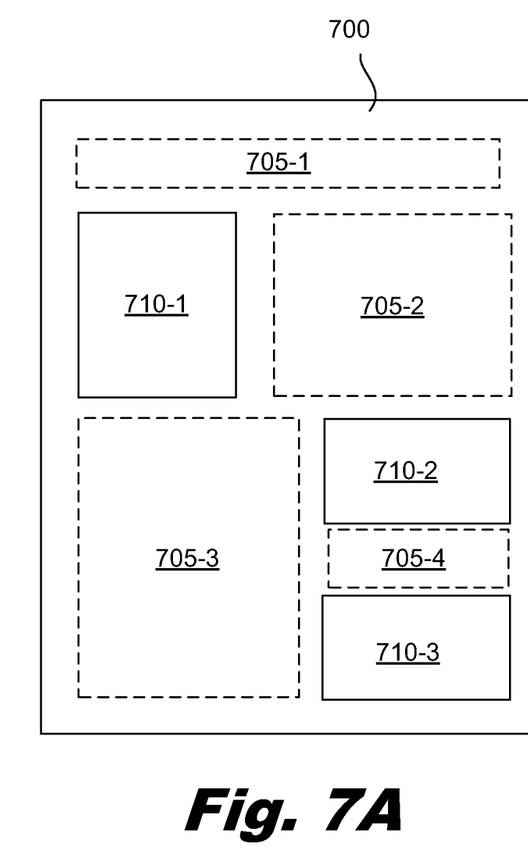
FIG. 7A and 7B are diagrams of enhancements to a print file generated in the communication architecture, according to one example of principles described herein.

A variety of enhancements data may be layered on top of the PCLm raster data. For example, sections of the raster data may be labeled as text and other sections labeled as images. FIG. 7A is a diagram that shows an illustrative page (700) of raster data with portions of the page designated as text (705) and portions of the page designated as images (710). This designation can provide additional context that may assist in the printing, viewing or manipulation of the PCLm file. For example, a printer may apply a first set of printing enhancements when printing portions of the file are designated as text and a second set of printing enhancements when printing portions of the file are designated as images. The text portions may be printed using edge enhancement and using monochrome ink. Image portions may be printed using enhanced red/green/blue techniques that increase the saturation and contrast in the printed images. The images may also have softer edges and transitions.

Figure 7B:
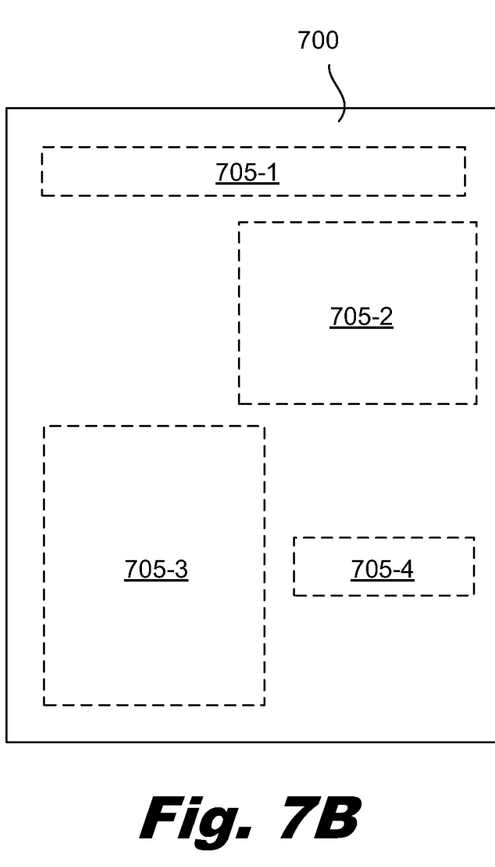

The designation of text and image portions of the file also provide other advantages. For example, when viewing or printing a file, the user may wish to differentiate between the images and text. FIG. 7B shows the PCLm page (700) with only the text displayed. If the user is only interested in the text, presenting the document in this way can shrink the file size and allow for quicker and more efficient printing of the document. The user can conserve a significant amount of ink by only printing the text. Additionally, if the user wishes to apply optical character recognition to the file, the optical character recognition can be applied only to the portions labeled as text. This can provide faster processing and the ability to process the file on computing devices with lower processor and memory capacity. Additionally or alternatively, the file may designate each pixel in the raster data as being a text pixel or image pixel.

The image enhancements do not interfere with printing or viewing of the file by devices that do not recognize the enhancements. For example, if a basic printer does not recognize or support the enhancement, the printer simply ignores the enhancements.

In sum, the ePCL architecture allows users to rapidly discover a print device, its capabilities, setup the print job with their specific requirements, and print. Using this process, a new device may be able to begin printing in less than 2 minutes after logging onto the network. ePCL is uniquely designed to eliminate all the complexity of the initial process of printer setup as well as providing sufficient imaging technology to guarantee high quality output and page fidelity for any ePCL compliant print-device.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computing device for direct printing and scanning comprising:
   a processor to:
      execute a page description language stack for producing a deterministic print file of an electronic image, the deterministic print file being natively viewable in a Portable Document File (PDF) viewer,
      eliminate non-deterministic commands from a vocabulary of a page description language (PDL) of a print file to produce the deterministic print file,
   wherein the deterministic print file provides for beginning of printing the electronic image by a printer before the complete deterministic print file is received by the printer.

2. The computing device of claim 1, in which the deterministic print files are streamable raster files.

3. The computing device of claim 1, in which the deterministic print files are natively compatible with PDF applications.

4. The computing device of claim 1, in which the page description language comprises a strict subset of PDF commands to describe image data, the strict subset of PDF commands excluding the non-deterministic PDF commands.

5. The computing device of claim 1, in which the page description language comprises enhancement data that distinguishes between text and image data.

6. The computing device of claim 5, in which the enhancement data comprises a designator for each pixel that defines each pixel as a text pixel or an image pixel.

7. The computing device of claim 5, in which the enhancement data comprises a designator of a geometric area as text.

8. The computing device of claim 5, further comprising a program that does not recognize the enhancement data, the enhancement data being correctly printed or displayed by the program.

9. The computing device of claim 5, further comprising an optical character recognizer for using the enhancement data to selectively perform optical character recognition on portions of the deterministic print file that contains text.

10. The computing device of claim 1, in which the deterministic print files comprise a header to designate that the deterministic print files are streamable.

11. The computing device of claim 1, in which the deterministic print files comprise a streamable sequence of bits that are not changed by subsequent bits, such that the data can be printed as it is received.

12. The computing device of claim 1, further comprising:
at least one network connection protocol;
an authentication protocol;
a discovery protocol; and
a print job transmission protocol.

13. The computing device of claim 12, in which:
the authentication protocol comprises one or more of: WiFi, WiFi Direct, Local Area Network, and Universal Serial Bus protocols;
the discovery protocol comprises multicast domain name service;
a page description language comprises a basic level that all compliant device are configured to accept; and
a print job transmission protocol comprises internet printing protocol.

14. A method for printing a document comprising:
generating a deterministic print file with a strict subset of PDF commands using a computing device, the strict subset of PDF commands excluding non-deterministic PDF commands;
beginning to stream the deterministic print file to a printer; and
starting of printing of the deterministic print file with the printer prior to the printer receiving the entire deterministic print file.

15. The method of claim 14, further comprising receiving an indication at the computing device that printing has begun prior streaming the complete deterministic print file to the printer.

16. The method of claim 14, further comprising:
authenticating a new device on a network;
discovering devices on the network utilizing multicast domain name service;
selecting a PCLm compliant printer on the network;
sending a query of the printer capabilities using internet printing protocol, the query comprising at least one of: PCLm raster orientations, chromatic mode, backside duplex orientation, compression information, and ePCL version information; and
receiving a response to the query describing the printer capabilities.

17. The method of claim 16, in which generating a deterministic print file comprises generating a streamable raster file according printer capabilities described in the response.

18. The method of claim 14, further comprising:
generating enhancement data that distinguishes between text and image data; and
adding the enhancement data to the deterministic print file.

19. The method of claim 18, further comprising using the enhancement data for a first selective printing enhancement of the text data and for a second different selective printing enhancement of the image data.

20. A computer program product for printing a document, the computer program product comprising:
a non-transitory computer readable storage medium comprising computer usable program code embodied therewith, the computer usable program code comprising:
computer usable program code to, when executed by a processor, generate a deterministic print file from a number of PDF commands forming a page description language, the deterministic print file excluding non-deterministic PDF commands,
in which the deterministic print file provides for starting of printing of the deterministic print file with the printer prior to the printer receiving the entire deterministic print file.

* * * * *